United States Patent Office 3,577,429
Patented May 4, 1971

---

3,577,429
PHTHALOCYANINE DYE AND METHOD FOR MAKING SAME
Thomas C. Crawford, 4423 Ridgevalley Drive, Charlotte, N.C. 28208
No Drawing. Filed Mar. 11, 1968, Ser. No. 711,913
Int. Cl. C09b 47/08
U.S. Cl. 260—314.5          6 Claims

ABSTRACT OF THE DISCLOSURE

Copper tetra - (4) - sodiothiosulfatophthalocyanine dye useful for dyeing cotton and regenerated cellulose textiles green is prepared by simultaneously heating and aerating for 1–36 hours at 40° C.–90° C. and at pH 6.5–7.5 an aqueous composition comprising 1 part copper tetra-(4)-thiocyanophthalocyanine, 0.65–1.3 parts sodium bisulfite, and 0.65–1.3 parts sodium sulfite, and further characterized in that the parts of sodium sulfite and sodium bisulfite are approximately equal.

---

The present invention relates to phthalocyanine dye and method for making same.

The dye of the present invention is copper tetra-(4)-sodiothiosulfatophthalocyanine, which has the following structural formula:

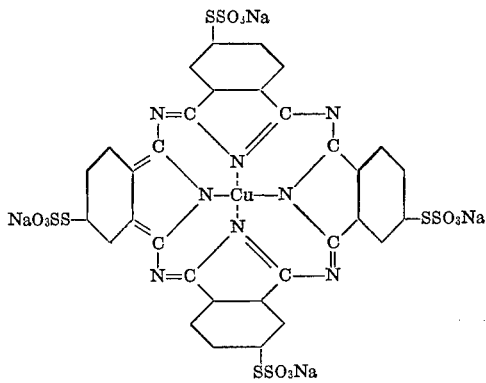

The method of the present invention may be described as a method for making copper tetra-(4)-sodiothiosulfatophthalocyanine comprising the step of simultaneously heating and aerating for 1–36 hours at 40°–90° C. and at pH 6.5–7.5 an aqueous composition comprising 1 part copper tetra-(4)-thiocyanophthalocyanine, 0.65–1.3 parts sodium bisulfite, and 0.65–1.3 parts sodium sulfite, and further characterized in that the parts of sodium sulfite and sodium bisulfite are approximately equal.

The dyestuff of the present invention is water soluble, and is particularly suitable for use in dyeing cotton or regenerated cellulose textile fibers to brilliant green shades. The dyestuff of the present invention may be applied to cotton or regenerated cellulose textile fibers either by the dyeing method disclosed in Belgian Pat. No. 681,524 or by the conventional reduction-oxidation dyeing method by reducing the dye to its water-soluble leuco form with sodium sulfide, padding the dye onto the fibers, steaming, washing with water, and oxidizing with sodium bichromate and acetic acid.

Dyeings made on cotton fabric using the dye of the present invention have very good wash fastness, good light fastness, good dry crock fastness, and commercially acceptable wet crock fastness. Moreover, the dye of the present invention has good tinctorial power, builds well from light to heavy shades, and has outstanding money value as a dye. When subjected to permanent press resin finishing, dyeings made from the dye of the present invention have minimal shade change and no change in light fastness and wash fastness properties.

The following is a more detailed description of the method of the present invention.

All parts herein are by weight unless otherwise specified.

An aqueous slurry is prepared by mixing in any desired order 1 part copper tetra-(4)-thiocyanophthalocyanine; 0.65–1.3 parts, and preferably 0.98 part, sodium bisulfite; 0.65–1.3 parts, and preferably 0.98 part sodium sulfite; and enough water to form a conveniently workable slurry; about 18–21 parts water is an exemplary amount. The parts of sodium sulfite and sodium bisulfite employed in preparing the aqueous slurry should be approximately equal. Optionally, there may be included in the slurry diethylene glycol monoethyl ether solvent, for example about 1.3 parts for each part copper tetra-(4)-thiocyanophthalocyanine. Optionally, there may also be included in the slurry hydrotropic agent, for example about 0.46 part sodium sulfonates of a mixture of toluene, ethylbenzene and xylene isomers.

The aqueous slurry should have pH 6.5–7.5, and preferably pH 7.0. If it is not within this range, the pH may be adjusted to within this range with dilute aqueous HCl or NaOH as required.

The aqueous slurry is heated at 40°–90° C., and preferably 80°–90° C., while stirring and aerating by bubbling air therethrough. Heating, stirring and aeration are continued until the dye of the present invention is formed, which will be indicated by the water-insoluble copper tetra - (4) - thiocyanophthalocyanine being converted into water-soluble copper tetra-(4)-sodiothiosulfatophthalocyanine. The dye will commerce forming after about 1 hour of heating and aerating, and will be completely formed after 36 hours, and usually after 5–10 hours, depending upon the temperature employed.

At this stage, the dyestuff exists as a stable, water-soluble concentrated composition of copper tetra-(4)-sodiothiosulfatophthalocyanine, either partially or fully in solution depending on the amount of water present, which may be used in this form as a component in forming the dyebath for dyeing.

If desired, water-soluble copper tetra-(4)-sodiothiosulfatophthalocyanine dye solids may be recovered from the above concentrated dye composition, such as by spray drying, or evaporating to dryness at 60°–70° C., or by cooling the concentrated dye composition to room temperature and salting out of solution by adding 20% aqueous NaCl until precipitation occurs. The resulting dye solids are also suitable for use as a component in forming a dyebath for dyeing. If the dye solids are to be recovered, it is suggested that the hydrotropic agent and diethylene glycol monoethyl ether solvent be omitted from the aqueous slurry used in making the dye.

The following are illustrative examples of making the dye of the present invention.

EXAMPLE 1

An aqueous slurry is prepared by mixing into a 600 ml. beaker, at room temperature, 175 gms. water, 20 gms. 35% aqueous hydrotropic agent (sodium sulfonates of 4.7% toluene, 2.1% ethylbenzene, 22.1% p-xylene, 57.2% m-xylene and 13.4% o-xylene), 20 gms. diethylene glycol monoethyl ether, 115 gms. aqueous presscake containing 13.25% copper tetra-(4)-thiocyanophthalocyanine solids (U.S. Pat. No. 2,342,662), 15 gms. sodium bisulfite and 15 gms. sodium sulfite. The delivery end of a 1.5 cm. diameter glass tube is immersed in the slurry and the slurry is aerated by continuously pumping (bubbling) air through the slurry while the slurry is stirred. While stirring and aeration are continued, the slurry is heated gradually to 80°–90° C. and aeration and stirring are continued at 80°–90° C. for 5 hours. The product is a water-soluble concentrated solution of copper tetra-(4)-sodiothiosulfatophthalocyanine dyestuff, containing about 6% copper tetra-(4)-sodiothiosulfatophthalocyanine.

EXAMPLE 2

This example is the same as Example 1 above, except that the aqueous slurry is heated and aerated at 40° C. for 36 hours instead of at 80°–90° C. for 5 hours. A concentrated solution of the dye of the present invention results.

EXAMPLE 3

Copper tetra-(4)-sodiothiosulfatophthalocyanine may be prepared as follows. This example is the same as Example 1 above, except that the hydrotropic agent and the diethylene glycol monoethyl ether are omitted from the aqueous slurry, and except that the slurry is heated and aerated for 8 hours instead of 5 hours. A concentrated water-soluble slurry of the copper tetra-(4)-sodiothiosulfatophthalocyanine dye results, which dye is recovered as solids by evaporating to dryness at 60°–70° C.

EXAMPLE 4

This example is the same as Example 1 above, except that the diethylene glycol monoethyl ether is omitted, and except that the slurry is heated and aerated for 8 hours instead of 5 hours. The resulting water-soluble concentrated copper tetra-(4)-sodiothiosulfatophthalocyanine composition is dried by evaporating to dryness at 60°–70° C., resulting in the dye of the present invention in solids form.

EXAMPLE 5

This example is the same as Example 1 above, except that the hydrotropic agent is omitted, and except that the slurry is heated and aerated for 8 hours instead of 5 hours. The resulting water-soluble concentrated copper tetra-(4)-sodiothiosulfatophthalocyanine composition is dried by evaporating to dryness at 60°–70° C., resulting in the dye of the present invention in solids form.

EXAMPLE 6

This example is the same as Example 1 above, except that the amount of sodium sulfite employed is lowered to 10 gms. and except that the amount of sodium bisulfite employed is lowered to 10 gms.

EXAMPLE 7

This example is the same as Example 1 above, except that the amount of sodium sulfite employed is increased to 20 gms., and except that the amount of sodium bisulfite employed is increased to 20 gms.

The following relates to using the dye of the present invention.

A heavy shade brilliant green dyeing is made on woven cotton oxford cloth shirting weighing 4 oz./sq. yd. as follows. The dyebath is prepared by mixing 24 oz. of the concentrated dye solution of Example 1, 13 oz. urea, 0.5 oz. sodium alginate migration inhibitor and enough water at 75° F. to bring to 1 gallon. The fabric is padded through the dyebath at 140° F., squeezed to 60% wet pick-up based on fabric weight, dried to substantial dryness, padded through a bath at room temperature containing 3 oz. 39% aqueous $Na_2S_4$ and 27 oz. NaCl per gallon of water, squeezed with nip rollers, exposed to air for 30 seconds, rinsed with water, scoured with soap, rinsed with water and dried.

The resulting dyeing had good light fastness, showing a trace break after 20 hours in the carbon-arc light fastness tester, and had very good wash fastness to the No. 3 AATCC wash fastness test, showing Gray scale pattern 4–5 and stain 5 in which 5 is optimum.

What is claimed is:
1. Copper tetra-(4)-sodiothiosulfatophthalocyanine.
2. A method for making copper tetra - (4)-sodiothiosulfatophthalocyanine comprising the step of simultaneously heating and aerating for 1–36 hours at 40°–90° C. and at pH 6.5–7.5 an aqueous composition comprising 1 part copper tetra-(4)-thiocyanophthalocyanine, 0.65–1.3 parts sodium bisulfite, and 0.65–1.3 parts sodium sulfite, and further characterized in that the parts of sodium sulfite and sodium bisulfite are approximately equal.
3. A method as defined in claim 2, and further characterized in that said aqueous composition also contains about 0.46 part sodium sulfonates of a mixture of toluene, ethylbenzene and xylene isomers.
4. A method as defined in claim 2, and further characterized in that said aqueous composition also contains diethylene glycol monoethyl ether.
5. A method as defined in claim 2, and further characterized in that said composition also contains about 0.46 part sodium sulfonates of a mixture of toluene, ethylbenzene and xylene isomers and about 1.3 parts diethylene glycol monoethyl ether.
6. A method as defined in claim 2, and further characterized in that said pH is 7, in that the amount of sodium bisulfite is 0.98 part, in that the amount of sodium sulfite is 0.98 part, and in that said aqueous composition also comprises 1.3 parts diethylene glycol monoethyl ether, and 0.46 part sodium sulfonates of 4.7% toluene, 2.1% ethylbenzene, 22.1% p-xylene, 57.2% m-xylene and 13% o-xylene.

References Cited

UNITED STATES PATENTS 3,236,860   2/1966   Schultheis et al. ____ 260—314.5

HENRY R. JILES, Primary Examiner

H. I. MOATZ, Assistant Examiner

U.S. Cl. X.R.

8—54.2, 35